(12) United States Patent
Doneff (10) Patent No.: US 9,874,201 B2
(45) Date of Patent: Jan. 23, 2018

(54) PRESSURE GENERATING DEVICE FOR GENERATING ENERGY FROM SOLAR AND/OR WIND ENERGY

(71) Applicant: Hans-Peter Doneff, Munich (DE)

(72) Inventor: Hans-Peter Doneff, Munich (DE)

( * ) Notice: Subject to any disclaimer, the term of this patent is extended or adjusted under 35 U.S.C. 154(b) by 97 days.

(21) Appl. No.: 14/849,501

(22) Filed: Sep. 9, 2015

(65) Prior Publication Data

US 2015/0377220 A1 Dec. 31, 2015

Related U.S. Application Data

(63) Continuation of application No. PCT/EP2014/000654, filed on Mar. 12, 2014.

(51) Int. Cl.
*F03G 6/04* (2006.01)
*F03D 1/04* (2006.01)
*F03D 9/00* (2016.01)
*F03D 3/04* (2006.01)

(52) U.S. Cl.
CPC ............... *F03G 6/04* (2013.01); *F03D 1/04* (2013.01); *F03D 3/04* (2013.01); *F03D 9/007* (2013.01); *F03G 6/045* (2013.01); *F05B 2240/13* (2013.01); *F05B 2240/131* (2013.01); *F05B 2240/133* (2013.01); *F05B 2240/215* (2013.01); *F05B 2240/217* (2013.01); *Y02E 10/465* (2013.01); *Y02E 10/72* (2013.01); *Y02E 10/74* (2013.01); *Y02P 70/523* (2015.11)

(58) Field of Classification Search
CPC . F03G 6/001; F03G 6/04; F03G 6/045; F03G 6/06; F03D 9/007
See application file for complete search history.

(56) References Cited

U.S. PATENT DOCUMENTS

2004/0148933 A1* 8/2004 Miller ................ F03D 1/04
60/641.8

* cited by examiner

*Primary Examiner* — Audrey K Bradley
(74) *Attorney, Agent, or Firm* — Hackler Daghighian Martino & Novak (57) ABSTRACT

A pressure generating device has a housing and a lamellar arrangement with a number of lamellae separated by gaps. The lamellae are manufactured from solar glass. The pressure generating device has a means for converting the solar energy incident through the lamellar arrangement into thermal energy, such that, by this means the air situated in the interior of the pressure generating device can be heated. The pressure generating device has at least one air inlet opening through which air can enter the interior of the pressure generating device and at least one second air outlet opening through which the heated air can emerge from the interior of the pressure generating device.

7 Claims, 7 Drawing Sheets

PRESSURE GENERATING DEVICE FOR GENERATING ENERGY FROM SOLAR AND/OR WIND ENERGY

CROSS-REFERENCE TO RELATED APPLICATIONS

This continuation application claims priority to PCT/EP2014/000654 filed on Mar. 12, 2014 which has published as WO 2014/139675 A1 and also the German application number 10 2013 004 277.1 filed on Mar. 13, 2013 and also German application number 20 2013 002 400.3 filed on Mar. 13, 2013, the entire contents of which are fully incorporated herein with these references.

DESCRIPTION

1. Field of the Invention

The invention relates to a pressure generating device for an installation for generating energy from wind and/or solar energy.

2. Background of the Invention

It is known to use solar energy photovoltaic or by using mirror systems for the generation of electric current. It is also known that wind energy is used to generate electric current in wind energy plants by propellers or Savonius and Darrieux rotors or similar devices. Both types of energy generation have their known drawbacks: if the sun does not shine, installations that use solar energy cannot generate electric current. If the wind does not blow, generating current by using wind energy is not possible.

It is an object of the present invention to provide a pressure generating device for an installation for energy generation by which energy, in particular electrical energy, can be generated by solar energy and/or wind energy.

SUMMARY OF THE INVENTION

According to the invention this object is achieved in that the pressure generating device, having a casing comprises a lamella arrangement with a number of lamellas, which are separated by gaps, that the lamellas are made of solar glass, that the pressure generating device comprises means for converting the incident solar energy passing through the lamella arrangement into thermal energy, so that by these means the air inside the pressure generating device is heatable, that the pressure generating device comprises at least one air inlet, through which air can enter into the interior of the pressure generating device, and at least one air outlet, through which heated air from the interior of the pressure generating device can exit.

The pressure generating device according to the invention for an installation for generating energy from wind energy and/or solar energy is distinguished in that it is able to generate electrical energy advantageously from both contrary energy systems—solar energy and wind energy. The operational safety of an installation for energy production using the pressure generating device according to the invention is increased because it also generates electrical energy when there is only wind blowing, but no sun is shining and vice versa.

Another advantage of the pressure generating device according to the invention is that it is made compact and can be manufactured easily and inexpensively.

An advantageous embodiment of the invention provides that the pressure generating device is designed as suction system. In the pressure generating device a negative pressure is generated which causes the pressure generating device to suck in air through a turbine connected to it by a conduct, so that a turbine wheel of this turbine is rotated.

A further advantageous embodiment of the invention provides that the pressure generating device is designed as pressure system. In the pressure generating device according to the invention a positive pressure is generated and the pressurized air exiting the pressure generating device according to the invention propels the turbines connected to it through conducts.

An another advantageous of the embodiment of the invention relates to an installation for energy generation, in particular electrical energy from wind energy and/or solar energy, which uses the pressure generating device according to the invention.

An another advantageous embodiment of the invention relates to a turbine for an installation for generating energy, in particular electrical energy, from wind energy and/or solar energy, which comprises a turbine wheel arranged in a casing, wherein it is provided that the turbine comprises an inner tube permeable to air, which is surrounded by an outer tube impermeable to air, and that the turbine comprises an air inlet with a turbulator arranged therein, through which the air entering the turbine is provided with a swirl.

Further advantageous embodiments of the invention are subject matter of the dependent claims.

BRIEF DESCRIPTION OF THE DRAWINGS

Further details and advantages of the invention are shown in the two embodiments, which will be described below with reference to the figures. Shown are.

DETAILED DESCRIPTION OF THE PREFERRED EMBODIMENTS

In FIGS. 1 to 4 a first embodiment of an installation 1 for generating energy from wind and/or solar energy is schematically shown. The installation 1 is comprises a pressure generating device 10, in which, as described below, a negative pressure can be generated. This pressure generating device 10 is connected to a turbine 30 by a conduct 31, which provides an inlet 32, through which surrounding air can be sucked in. Since in the pressure generating device 10 a negative pressure is generated, air flows through the inlet 32 into the turbine 30. The negative pressure in the pressure generating device 10 causes the air flowing in from the inlet 32 to flow further to the pressure generating device 10, whereby a turbine wheel (not shown in FIGS. 1 to 4) of the turbine 30 is rotated, so that it can drive a generator, also not shown, to generate electric current. Of course it is also possible that a shaft of the turbine wheel of the turbine 30 serves as a drive shaft for a mechanical device arranged downstream, so that the rotational energy generated by the turbine 30 and delivered via the shaft to this device can be used by it. In the following it is assumed that the turbine 30 serves for generating electric current, i.e. it drives a generator.

Figure 3:
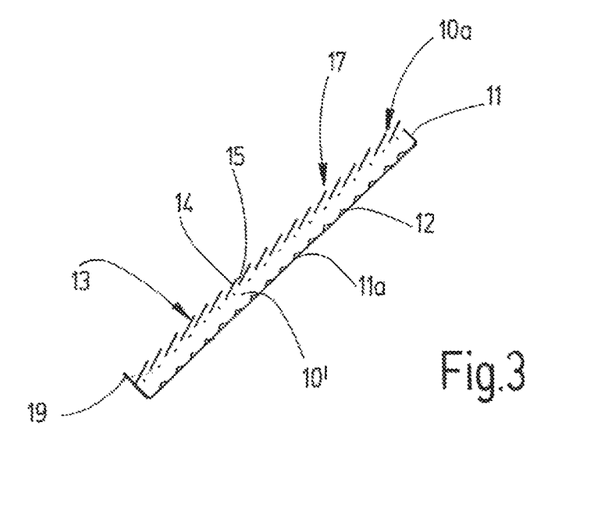
FIG. 3 is a sectional view of the first embodiment.

In order to be able to generate the negative pressure driving the turbine 30 through solar-thermal and/or by the action of wind energy, the pressure generating device 10 is configured as follows:

As best seen in FIG. 3, the pressure generating device 10 is box-shaped and comprises a casing 11 with a ground area 11*a*, at or over which a mirror arrangement 12, in particular a parabolic mirror trench, is arranged. On its top side 10*a* the pressure generating device 10 comprises a lamella arrangement 13 made of solar glass, whereat single lamellas 14 are separated by gaps 15, respectively, so that air from the interior 10' of the pressure generating device 10 can rise through these gaps 15 and therefore can leave the pressure generating device 10, so that a negative pressure driving the turbine 30 is built up.

The operation of the pressure generating device 10 is as follows: sunlight impinging on the lamella arrangement 13 passes through the lamellas 14 made of solar glass to the mirror arrangement 12 and is reflected by it. The mirror arrangement 12 is designed in a way that its focal line is being in the interior 10' of the pressure generating device 10 so that the air being in the interior 10' is heated, thereby rises and exits the pressure generating device 10 through the gaps 15 between the lamellas 14 of the lamella arrangement 13. The negative pressure, which drives turbine 30, is generated in this way by the impact of solar energy. The pressure in the pressure generating device 10 is therefore lower than the pressure at the inlet 32, so that, as a result of the negative pressure in the pressure generating device 10, air flows through the inlet 32, through the turbine 30 and through the adjoining conduct 31 into the interior 10' of the pressure generating device 10. This creates a suction current, which drives the turbine 30.

Figure 1:
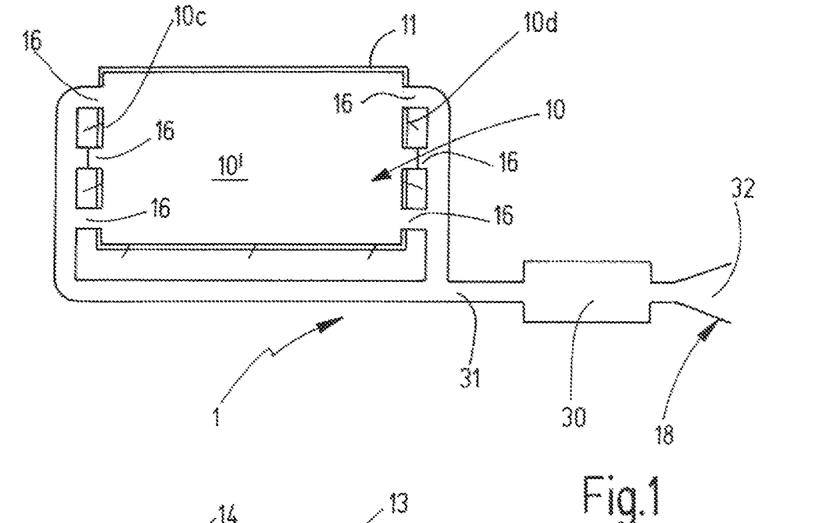
FIG. 1 is a schematic view of a first embodiment.
Figure 2:
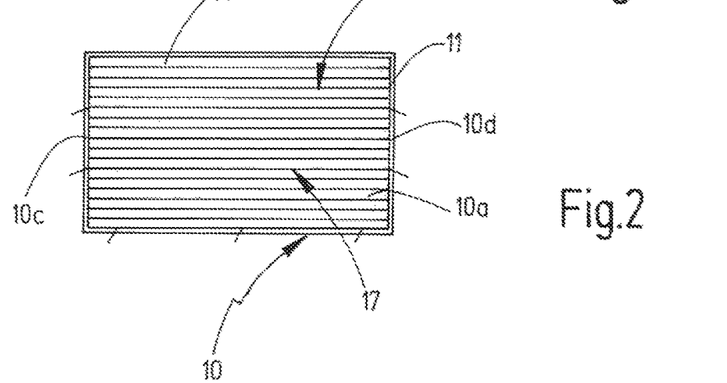
FIG. 2 is a top view of the first embodiment.

As best seen in FIG. 1, the conduct 31 widens and surrounds the pressure generating device 10 in such a way, in particular along its side surfaces 10*c*, 10*d* on which preferably stream inlets 16 are provided, so that the airstream flowing through turbine 30 and introduced through the conducts 31 can enter through those stream inlets 16 into the interior 10' of the pressure generating device 10.

It is clearly evident to a skilled person, that this design is not mandatory. Sufficient for the operation of the installation 1 is that via the pressure generating device 10 an adequate negative pressure is built up, so that through the conduct 31 air is suctioned by the turbine 30 and is led into the interior 10' of the pressure generating device 10. Of course it is also possible that the conduct 31 is an integral part of the casing 11 of the pressure generating device 10 and the turbine 30 is coupled to the outlet of this unit.

To facilitate the exiting of the air heated as mentioned before from the interior 10' of the pressure generating device 10, it is preferably provided that—as best seen in FIG. 3—the lamellas 14 open upwards, so that the heated air can rise through the gaps 15 bounded by the lamellas 14.

The entirety of the gaps 15 creates an outlet 17 of the pressure generating device 10, through which the airstream driving the turbine 30 can leave. In the shown case here, wherein the pressure generating device 10 is designed as a suction system, the stream inlet 32 of the turbine 30 creates an inlet 18 for the airstream flowing through installation 1.

In the afore description it is assumed that in the interior 10' of the pressure generating device 10 and adjacent to its ground 11*a* a mirror arrangement 12 is provided for reflecting and focusing the sunlight impinging on the pressure generating device 10. This is, however, not mandatory, as other measures can be provided, to heat the air located in the interior 10' by the incident sunlight and therefore force it to rise, which results in the creation of the negative pressure driving the turbine 30. For example, by an appropriate design of the pressure generating device 10 the so called "greenhouse effect" can be used for heating of the air being in the interior 10'. So it is only essential that the pressure generating device 10 provides means, through which incident sunlight can be used for increasing the temperature of the air being in the interior 10' of the pressure generating device 10.

In FIGS. 1 to 4 a parallel formation of the mirror arrangement 12 and the lamella arrangement 13 is shown. This is not mandatory. It is also possible to provide an angle between those two arrangements 12, 13. It is only essential that by the mirror arrangement 12 the sunlight entering through the lamella arrangement 13 is collected and thereby the air in the interior 10' of the pressure generating device 10 is heated.

In practice the pressure generating device 10 is regularly installed on a roof, where the roof surface is tilted at a certain angle. In this case an arrangement of the mirror arrangement 12 and the lamella arrangement 13 at an angle adapted for the roof pitch is reasonable. It is also conceivable that the mirror arrangement 12 and the lamella arrangement 13 are arranged in the casing 11 in such a way that the angle enclosed by them is variable. A pressure generating device 10 designed in such a manner can be easily adapted to the respective mounting circumstances.

Figure 4:
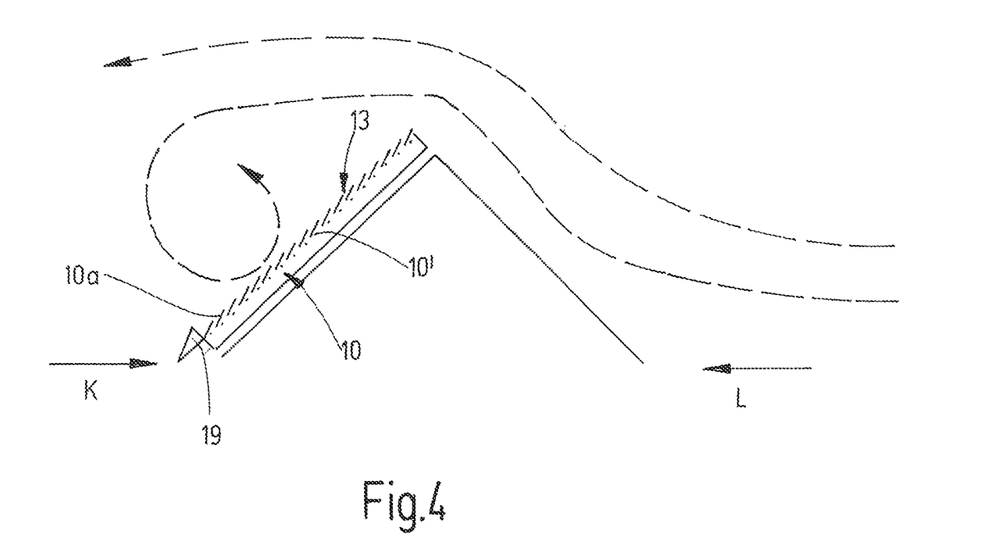
FIG. 4 is a schematic representation of the function of the first embodiment.

The creation of negative pressure caused by a solar thermal exposure of the pressure generating device 10 is enhanced—as described in FIG. 4—by the effect of a wind stream or—in the absence of solar radiation—replaced by it:

In FIG. 4 four wind directions K, L, M, N, are shown schematically whereas—as can be seen in particular from the lower representation of FIG. 4—the wind direction K runs so that in particular it hits the lamella arrangement 13 orthogonally, so that the lamella arrangement 13 is located on the windward side of the wind stream of the wind direction K. In a corresponding manner then a wind stream arises from wind direction L of the pressure generating device 10 from the leeward side.

If air is flowing from direction K over the surface 10*a* of the pressure generating device 10 shown in FIG. 4, it takes along the rising air from the pressure generating device 10 and therefore causes an enhanced streaming out of said air from the interior 10' of the pressure generating device 10, so that the negative pressure further increases.

It is advantageous, if the pressure generating device 10—as shown in FIG. 3—is placed in an inclined way. By this inclination—similar to the airfoil of an airplane—an induced velocity is generated, which adds to the streaming velocity of the airstream hitting the pressure generating device 10. The air being in the interior 10' of the pressure generating device 10 is sucked on in a better way, whereby the negative pressure is increased further.

As can be seen in the lower representation of FIG. 4 by said inclination it is also achieved that the air flowing from direction L, which means air from leeward side of the pressure generating device 10, hitting it, is swirled, whereby a vortex formation and therefore a negative pressure is created over the surface 10a of the pressure generating device 10.

Through this inclination of the pressure generating device 10 the induced velocity of the wind stream hitting it from the direction K is increased, whereby this induced velocity adds to the flow velocity of the wind. The resulting increased velocity causes an enhanced generation of negative pressure in the interior 10' of the pressure generating device 10.

To enhance this effect further, it can be provided that the pressure generating device 10 comprises turbulators 19 like airfoil segments, tapered wings or pitched lead elements, which increase the induced velocity and therefore increase the velocity of the air stream impacting the pressure generating device 10 in a swirled way. Through this, an increased negative pressure in the interior 10' of the pressure generating device 10 is generated, whereby its efficiency is enhanced.

Figure 5:
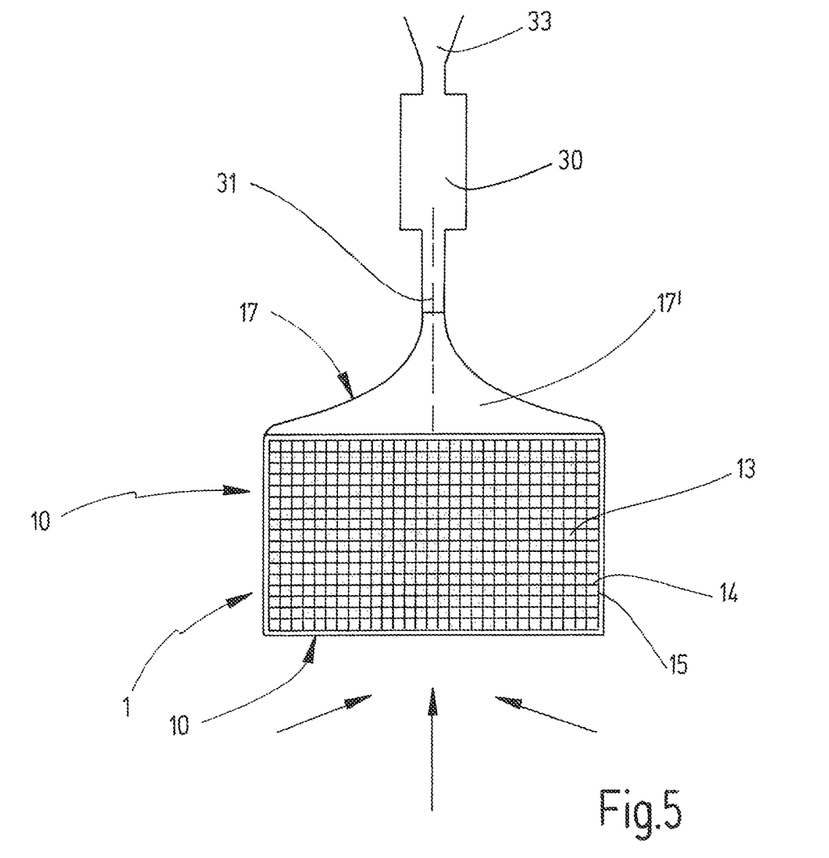
FIG. 5 is a schematic view of a second embodiment.
Figure 6:
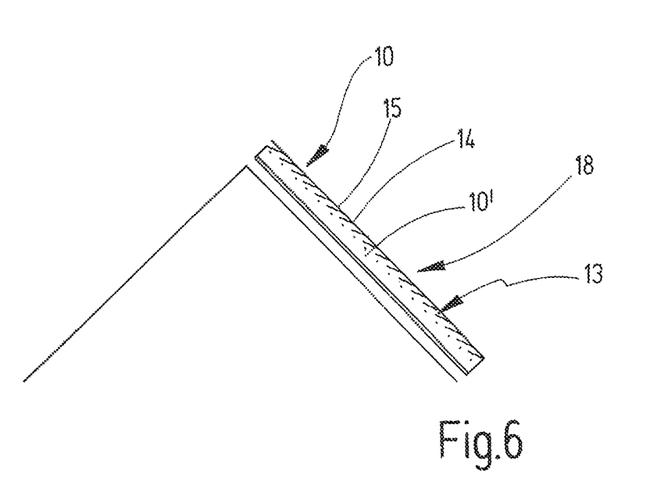
FIG. 6 is a sectional view of the second embodiment.

In FIGS. 5 and 6 a second embodiment of the installation 1 is shown, in which corresponding parts are provided with the same reference signs and are no more further described. The essential difference between the first and the second embodiment is that the pressure generating device 10 does not serve—as in the first embodiment—for generating negative pressure, but for generating positive pressure. The heated air being in the interior 10' of the pressure generating device 10, heated by the solar energy impacting it, in the second embodiment does not flow—as in the first embodiment—through the gaps 15 between the lamellas 14 of the lamella arrangement 13, but the pressure generating device 10 comprises—as best can be seen in FIG. 6—an air outlet 17', through which the heated air can exit and is led by the conduct 31 to the turbine 30 and exit it through an outlet 33. In contrast to the first embodiment, in the second embodiment the air to be supplied to the turbine 30 flows through the gaps 15 located between the lamellas 14 into the interior 10' of the pressure generating device 10, the gaps 15 of the lamella arrangement 13 therefore form the air inlet 18 of the second embodiment. This can be achieved in that, when using the pressure generating device 10 as a positive pressure generating device, it is mounted in a configuration rotated by 180 degrees around a vertical axis compared to the first embodiment, so that the lamellas 14 of the lamella arrangement 13 and therefore the gaps 15 located between the lamellas 14 are oriented downwards, so that the suctioned air from its surrounding is heated by solar radiation, rises and exits through the air outlet 17' of the pressure generating device 10 and reaches the turbine 30 over the conduct 31.

As best can be seen in FIG. 6, in the second embodiment the lamellas 14 of the lamella arrangement 13 are arranged in such a way that the gaps 15 defined by them facilitate an easy entering of the airstream hitting the surface 10b into the interior 10' of the pressure generating device 10. It is provided that the casing 11 of the pressure generating device 10 is designed in such a way that the air being in the interior 10' and heated by the mirror arrangement 12 can essentially escape only through the outlet 17. In this way the positive pressure caused by the wind stream hitting the pressure generating device 10 is increased through the effect of solar energy.

In FIGS. 7 to 10 an embodiment of a turbine in particular suitable for said installation 1 is shown. It comprises a casing 41, for example an air impermeable outer tube 41', which has on one side 40a an air inlet 42, through which the turbine 30 can be supplied with air coming in from inlet 32. This air drives a turbine wheel 35, which is connected to a generator 37 by a shaft. On a side 40b opposing side 40a the casing is provided with an air outlet 43, through which the airstream led to the turbine 30 can exit the casing 40 and can enter the conduct 31.

Figures 7, 8, 9:
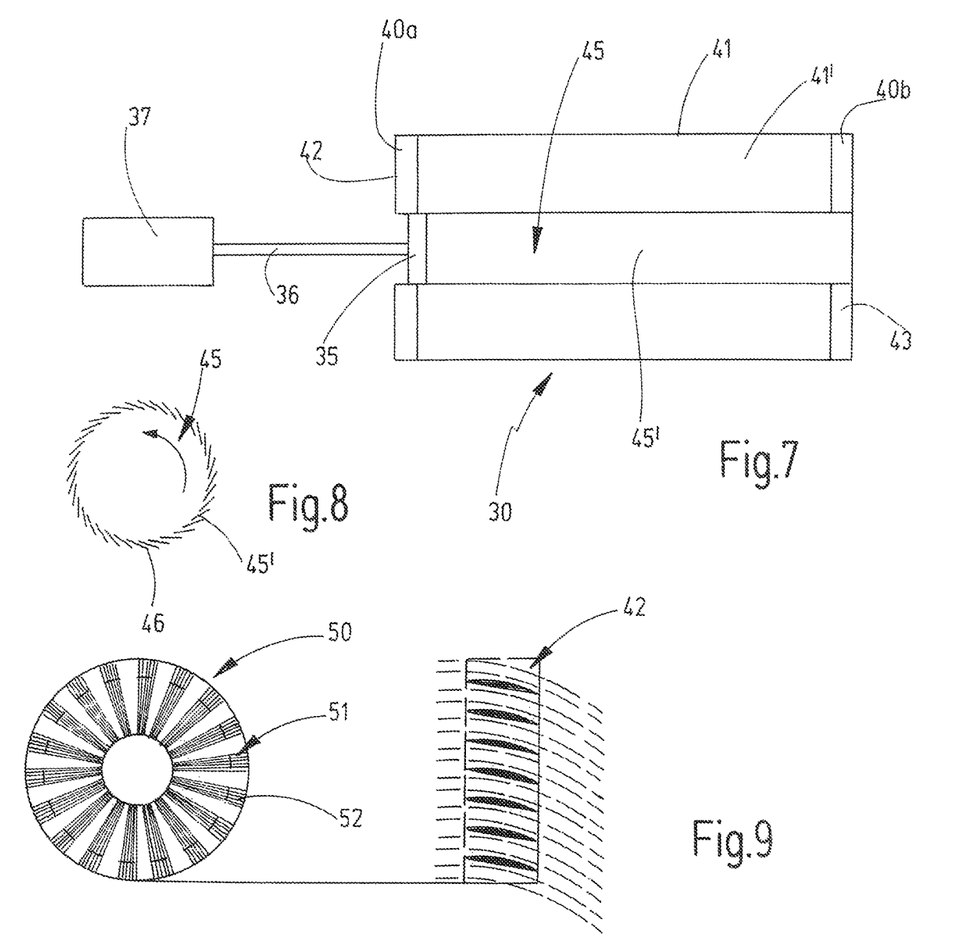
FIG. 7 is a schematic representation of a turbine for an installation for energy production.
FIG. 8 is a sectional view of an inner tube of the turbine according to FIG. 7.
FIG. 9 is a schematic view of a turbulator.

In said casing 41 an air permeable inner tube 45 is arranged, which is, in this case, designed as a lamella tube 45', which is shown in FIG. 8 in a sectional view. The inner tube 45 is closed on the side 40b of the casing, so that air can only leave through the lamellas of the lamella tube 45.

In the air inlet 42 a turbulator 50 is provided, as shown in FIG. 9. It is designed as a paddle wheel 51 and serves for giving a swirl to the air flowing in from inlet 32, while the blades 52 of the turbulator 50 preferably have an airfoil-like profile. So the turbulator 50 serves for transforming the linear stream of the inflowing air to a spiral stream. The spiral stream generated in this way enters through the lamellas 46 of the inner tube 45' the space between the inner tube 45' and the outer tube 41' and causes an increased negative pressure on the outside of the inner tube 45', which is based on centrifugal effects and on the streaming velocity according to Bernoulli's law. By this, an enhanced drive of the turbine wheel 35 is caused.

Figure 10:
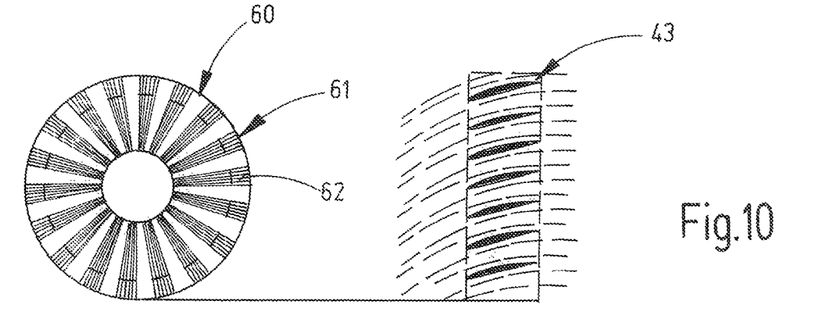
FIG. 10 is a schematic view of a rectifier.
Figure 11:
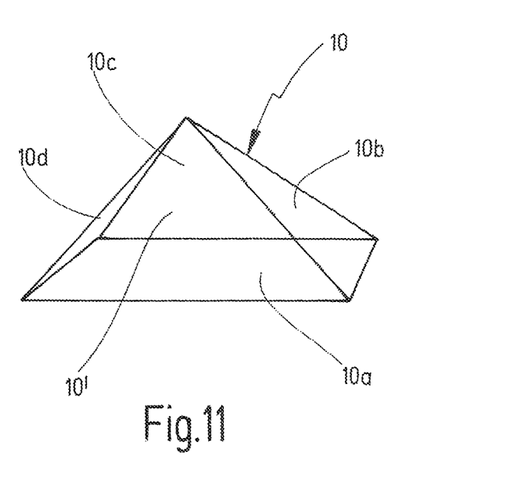
FIG. 11 is a schematic view of a third embodiment.
Figure 12:
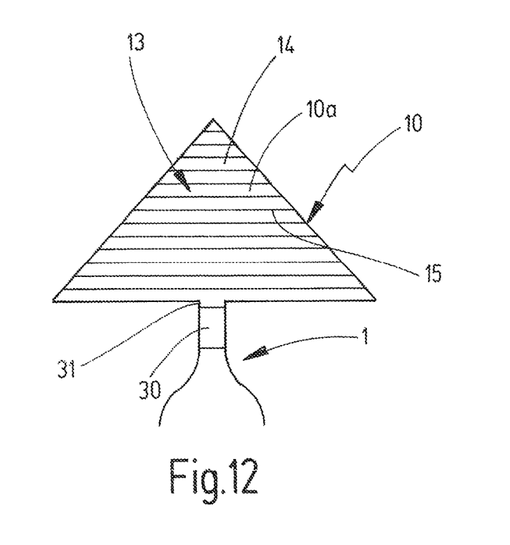
FIG. 12 is a side view of the third embodiment of FIG. 11.

In the air outlet 43 a rectifier 60 is arranged, as shown in FIG. 10, which is designed as paddle wheel 61 with blades 62. This causes the spiral stream inside the turbine 30 to change back into a linear stream, which can easily exit the pressure generating device 10 over the conduct 31.

Figure 13A:
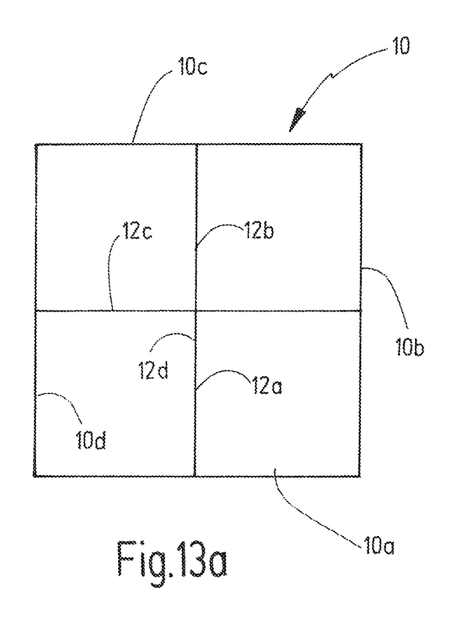
FIG. 13a is a top view of one variant of a mirror arrangement of the third embodiment.
Figure 13B:
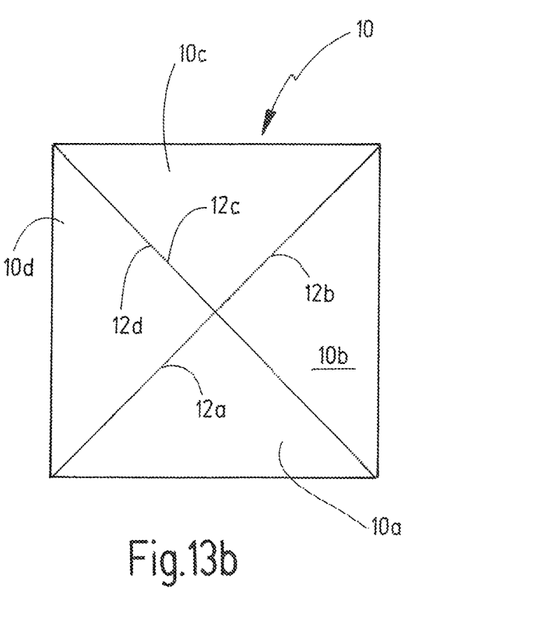
FIG. 13b is a top vie of another variant of a mirror arrangement of the third embodiment.

In FIGS. 11 to 13b a third embodiment of the device is shown, in which corresponding parts are provided with the same reference signs and are no more further described. The characteristic of the third embodiment of installation 1 is now that the pressure generating device 10 is designed in a pyramid shape. For this, four triangle shaped pressure generating devices 10a-10d are arranged rectangular to each other, so that a pyramid shape is formed. On the respective outsides of the pyramid lamella arrangements 13 made out of solar glass (not shown in FIG. 11) are arranged, where the single lamellas 14 are separated by a gap 15, so that the air being in the interior 10' of the respective pressure generating devices 10a-10d can rise through these gaps 15 and therefore can escape from the pressure generating device 10, whereby a negative pressure driving turbine 30 arises. The mirror arrangement 12 located inside the pyramid is provided by four mirror arrangements 12a-12d, whereby those—as shown in FIG. 13a—connect opposing sides or—as shown in FIG. 13b—opposing corners of the pyramid. Through this, triangular mirror surfaces are formed, which intersect in the center and are rectangular to each other. A formation in this manner has the advantage that the negative pressure generated by the wind is generated on four sides and therefore, the efficiency increases. Also, the wind direction is of no more importance, only the wind force.

Figure 14:
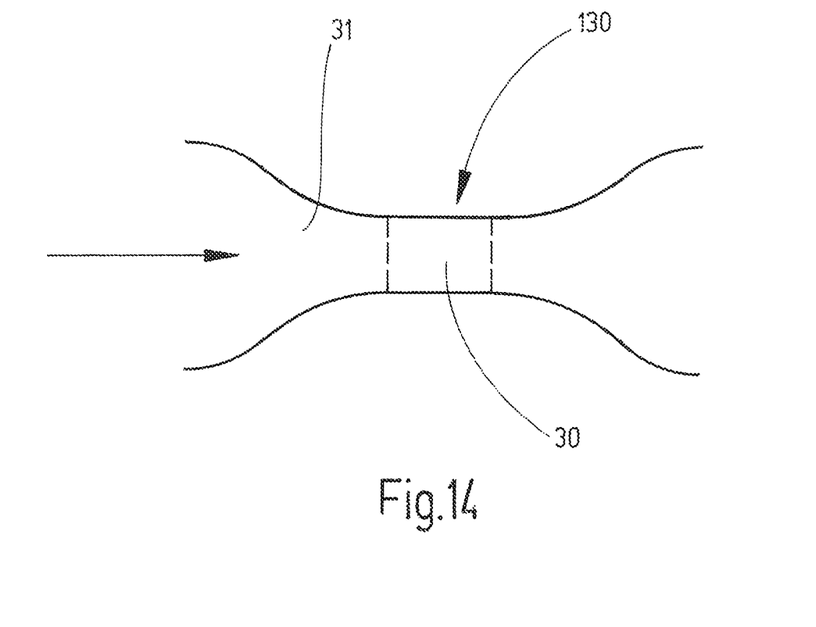
FIG. 14 is a schematic view of a turbine for an installation for energy generation, in sectional views respectively.

In FIG. 14 a further embodiment of a turbine for an installation for energy production is shown. The conduct 31 connecting the turbine 30 to the pressure generating device 10 is in this case provided as a Venturi tube with a bottleneck 130 and the turbine 30 is installed in the bottleneck 130 of the Venturi tube. Because at this place, according to Bernoulli's law, there is the highest streaming velocity, a higher efficiency is achieved.

Figure 15A:
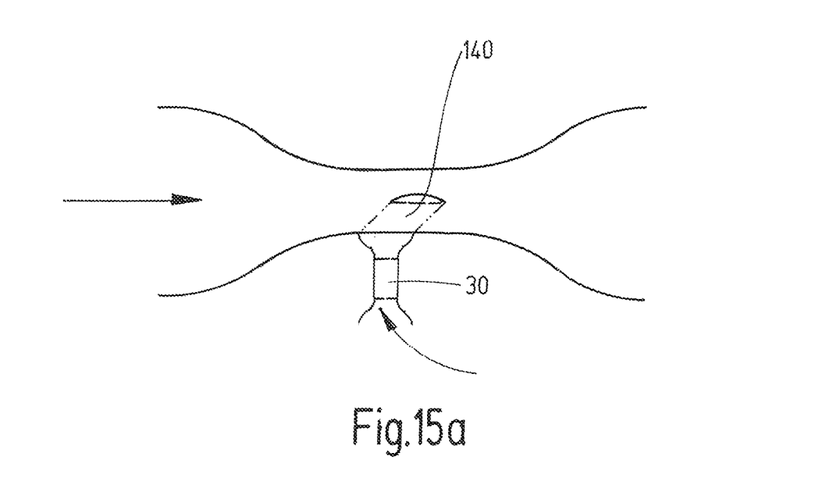
FIG. 15a is a schematic view of another turbine for installation for energy generation.
Figure 15B:
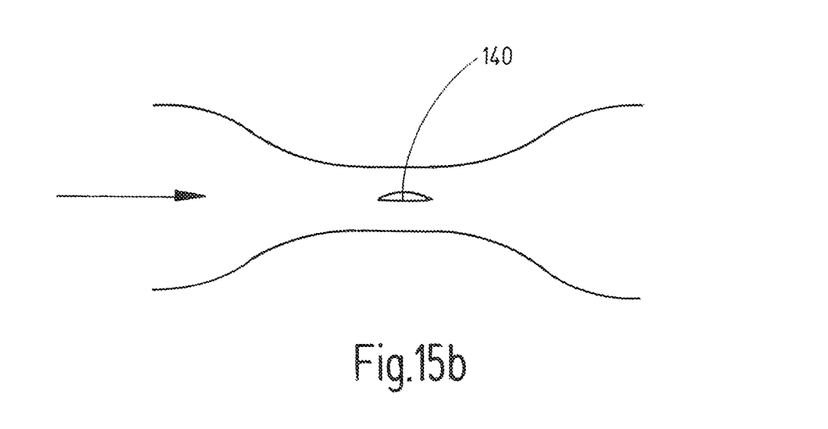
FIG. 15b is a schematic view of another turbine for installation for energy generation.
Figure 15C:
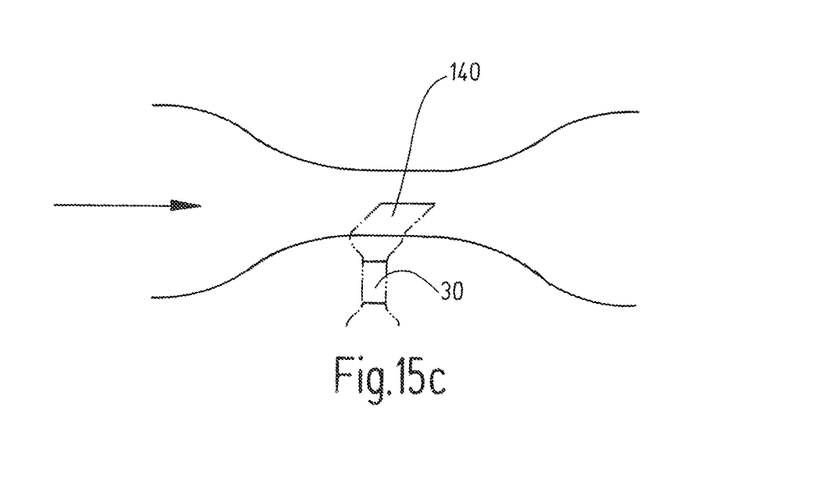
FIG. 15c is a schematic view of another turbine for installation for energy generation.

In FIGS. 15a to 15c a further embodiment of the afore construction is shown, so that corresponding parts are provided with the same reference signs and are no more further described. The essential difference between the embodiment of FIG. 14 and the one from FIGS. 15a to 15c is that in the bottleneck 130 of the Venturi tube an airfoil segment 140 is arranged. It is designed—as best can be seen in the top view shown in FIG. 15b—preferably trapezoidal, hollow inside and open on both sides, whereby its underside is fixedly connected to the bottleneck 130 of the Venturi tube. The top of this airfoil segment 140 is located in the center of the stream. The flow onto this airfoil segment 140 generates on one side a negative pressure and on the other side a positive pressure. Due to an equalization of the pressure between both sides, the upper end of the airfoil segment 140 is in a stronger flow. This creates a so-called border-vortex, in whose center there is a strong negative pressure. This negative pressure draws in air, which drives the turbine. Through the trapezoidal arrangement an induced velocity is generated, which increases the potential of the swirl created by the airfoil segment 140 and therefore increases the efficiency of the device.

In summary, it is to be noted that through the described measures a pressure generating device 10 is provided, which is able to use solar energy as well as wind energy for generating energy, in particular electric current. The pressure generating device 10 is built compact and therefore can be easily mounted, in particular onto roofs. As a result of the combined usage of wind energy and solar energy the operational safety of an installation for the generation of energy from solar and/or wind energy using this pressure generating device 10 is increased.

What is claimed is:

1. A pressure generating device for an installation for energy generation from at least one of solar and wind energy, the installation having a turbine, which is connected via a conduct with the pressure generating device, the pressure generating device comprising:
    a casing comprising at least one air inlet, through which air is configured to enter into an interior of the pressure generating device;
    at least one air outlet, through which heated air is configured to exit the interior of the pressure generating device;
    a means for conversion of impacting solar energy into thermal energy, wherein the air being in the interior of the pressure generating device is configured to be heated, and wherein the means for conversion of impacting solar energy into thermal energy is formed as a mirror arrangement;
    wherein the pressure generating device creates a negative pressure in the interior;
    wherein the air inlet of the pressure generating device is formed by one or more openings of the casing;
    wherein the casing of the pressure generating device has a lamella arrangement with a number of lamellas being separated by gaps, wherein the lamellas are made of solar glass;
    wherein the air outlet allowing an exit of heated air from the interior of the pressure generating device is formed by the gaps provided between the lamellas of the lamella arrangement.

2. The pressure generating device according to claim 1, wherein the pressure generating device comprises at least one turbulator.

3. An installation for the generation of electrical energy from at least one of wind and solar energy, the installation comprising a turbine which is connected to a pressure generating device by a conduct, the pressure generating device comprising:
    a casing comprising at least one air inlet, through which air is configured to enter into an interior of the pressure generating device, and at least one air outlet, through which heated air is configured to exit the interior of the pressure generating device;
    a means for conversion of impacting solar energy into thermal energy, wherein the air being in the interior of the pressure generating device is configured to be heated, and wherein the means for conversion of impacting solar energy into thermal energy is formed as a mirror arrangement;
    wherein the pressure generating device creates a negative pressure in the interior;
    wherein the air inlet of the pressure generating device is formed by one or more openings of the casing;
    wherein the casing of the pressure generating device has a lamella arrangement with a number of lamellas being separated by gaps, wherein the lamellas are made of solar glass;
    wherein the air outlet allowing an exit of heated air from the interior of the pressure generating device is formed by the gaps provided between the lamellas of the lamella arrangement.

4. The installation according to claim 3, wherein the pressure generating device comprises at least one turbulator.

5. The installation according to claim 3, wherein the turbine comprises an inlet, through which air is configured to enter into the turbine and is configured to flow through the conduct to the pressure generating device generating negative pressure.

6. The installation according to claim 3, wherein the conduct connecting the turbine and the pressure generating device is formed as a Venturi tube with a bottleneck and the turbine is arranged in the bottleneck of this Venturi tube.

7. The installation according to claim 3, further including an airfoil segment arranged in the conduct.

* * * * *